Patented Oct. 6, 1931

1,825,949

UNITED STATES PATENT OFFICE

CHARLES C. HAAS, OF WHITEWOOD, SOUTH DAKOTA

PROCESS OF TREATING ORES

No Drawing.  Application filed May 28, 1928.  Serial No. 281,362.

The present invention relates to a wet metallurgical process for the recovery of copper, zinc or lead, or several of these, from ores containing the same in a difficultly soluble condition, or ores which after being subjected to an oxidizing roast would contain relatively insoluble compounds of these metals, viz. not soluble in leaching liquors.

As an example of such minerals, I call attention to franklinite, which is a zinc ferrite, zinc oxide and ferric oxide being apparently combined with each other in such a way as to produce a compound, zinc ferrite, which is very difficultly acted upon by ordinary weak solutions such as dilute sulfuric acid, ammonia water and the like. Ores containing iron sulfide and also containing copper sulfide, zinc sulfide or lead sulfide (or several of these), in which the iron compounds and copper, zinc or lead compounds are very intimately associated with each other, and in which the iron content is considerable, upon being subjected to the usual oxidizing roast, for getting rid of sulphur, or converting the sulfur into oxides of sulfur for use say in making sulfuric acid, will likewise form, upon being subjected to an oxidizing roast, products containing a considerable proportion of zinc, copper and lead in the form of ferrites, and in this form they are very difficultly attackable by dilute acids, ammonia and the like.

It has been found, in accordance with the present invention, that by subjecting such ferrite material to a mild reducing roast, I am able to convert the whole or a very large proportion of the copper, zinc and lead into compounds which are readily attackable by dilute acids or ammonia, whereby the product of such reduction is capable of being leached to recover its metal content.

In accordance with the present invention, the ore or product containing ferrites, is first subjected to a reducing roast, that is to say the ferrite material is heated to a temperature above 400° C., and preferably about 550° C., the exact temperature being dependent upon the composition of the material under treatment and other factors. In general, the higher the temperature the lower the concentration of the reducing gases required. During this high temperature treatment, the ferrite material is treated with reducing gases such as carbon monoxide, hydrogen, hydrocarbons, or water gas, and these may be used alone or mixed with inert gases such as carbon dioxide, nitrogen and the like. The particular temperature should be selected with special reference to the content of the ferrite material. With the temperature high enough and the proper concentration of the gases the desired amount of reduction can be completed within a period of two hours or less.

The reduction of ferrite by the use of solid reducing agents, such as coal or the like, has heretofore been suggested in this art. However the results when using reducing gases, as described herein, are far superior.

It is preferable to so conduct the reducing operation (if acid is to be used as the leaching liquor) under such conditions as to reduce the ferric oxide to $Fe_3O_4$, so that only one-third of the iron present is reduced to the ferrous state, the iron present in the latter state being largely insoluble in the leaching liquors used subsequently. If ammonia is to be used as the leaching agent, this reduction can be carried to a further extent, but this is unnecessary. For the reduction of ferrite containing zinc, a temperature slightly above 500°C. has been found very satisfactory, and in order to prevent an excessive formation of ferrous oxide, the reducing gas preferably used may contain say about one-half its volume of carbon dioxide, which material allows oxidation of ferrous iron to ferroferric oxide, $Fe_3O_4$. The residual gas can be enriched in reducing gas and conveyed into the reduction furnace. At the temperature indicated, sulfates of zinc and copper which may be formed during the oxidizing roast (unless already leached out) will be largely converted into the oxides.

The function of the large proportion of $CO_2$ in the gas may be to oxidize any excessive amounts of ferrous oxide formed. The gas coming from the reducing zone may pass into a regenerator and be enriched with reducing gases, and thus may be used over and over.

Since the process can be carried out at a dull red heat, it may easily be applied commercially to the direct treatment (preliminary to leaching) of hot calcines discharged from an ordinary ore roasting furnace, the oxiding roast being assisted by the use of fuel is so desired. Sulfate of zinc and sulfate of copper which may be formed during the oxidizing roast will be largely reduced during the reducing treatment, although a portion of the sulfates may remain, in amount sufficient to make up for any loss of acid in handling, in the subsequent electrolytic treatment.

Of course, the calcines from the oxidizing roast can be cooled and reheated if desired, or, which is more preferable, the residue after leaching with acid, can be reheated and treated in a similar way.

In one method of procedure, the material from the reducing roast may be subjected to leaching with dilute sulfuric acid, to form a solution containing zinc sulfate or copper sulfate, this solution then being subjected to electrolysis to recover the metal and regenerate sulfuric acid, for reuse upon more of the ore which has been subjected to the reducing roast. It will be understood that where desired, the leach liquor can be suitably purified from iron and other impurities, or instead of subjecting to electrolysis, the acid leach liquor can be subjected to cementation, evaporation, or other methods of recovery of the metal content.

This process can be used to an advantage to treat zinc or copper ferrites which have been concentrated by subjecting to magnetic separation since the zinc or copper may be extracted without dissolving the iron to any appreciable extent.

The process is especially useful in the case of complex ores, containing for example copper and zinc. In this case it is advisable to subject the acid leach liquor to two electrolytic operations, one for recovering the copper, and one for the recovery of the zinc. Another mode of operation would be to subject the acid leach liquor to a cementation process with zinc, whereby the copper is removed as cement copper, the liquid being subsequently treated by electrolysis to recover the zinc.

While I have above referred to the treatment of ores, it will be understood that this term is used in its broad sense, including not only the ores themselves in their original form, but concentrates and other metallurgical products, mattes and the like, containing the metals above referred to, in the form of ferrites, or in forms which become converted into ferrites (largely or wholly or to some extent) during treating operations.

Another advantage of this process lies in the fact that manganese compounds can be reduced to the manganous state, the latter are not precipitated in the neutral leach and therefore may be recovered on the anode in the subsequent electrolytic deposition (as $MnO_2$).

Example

An ore containing principally zinc and iron sulfides was roasted at a temperature below 800° C., and leached with dilute sulfuric acid.

The residue was found to be practically pure zinc ferrite assaying:—

22.1% zinc
39.5% iron

On treating this residue for two hours at 600° C. with gas containing 50% CO and 50% $CO_2$ the product obtained from such treatment contained 19.4% zinc in the form of ZnO, of which 87.8% of the total was recovered in the subsequent leach with ammonia, while none of the iron was dissolved.

On leaching with 5% sulphuric acid, at room temperature the residue after such leach contained 2.1% zinc and 29.8% iron. In this case the recovery of the zinc was increased to 90.5% but at the same time 24.6% of the total iron was dissolved.

The same ore, in another case, was given a mild sulfating roast so that the calcines contained about 5% sulfate sulfur; on treating these calcines, immediately after they were discharged from the roaster, under conditions identical to those described above, 2.2% sulfate sulfur were unaltered, by the reduction, the remaining zinc sulfate being converted apparently to zinc oxide, for there was no evidence of any increase in sulfide contents of the product treated.

I claim:—

1. A process of treating an ore which contains iron and a metal of the group consisting of copper, zinc, lead, the proportion of iron to such other metal being such as to lead to the formation of insoluble refractory compounds of such other metal with ferric oxide, upon subjecting to an oxidizing roast, which process comprises roasting such ore under oxidizing conditions whereby a roasting product containing such insoluble refractory compounds results, subjecting such roasted product to the action of reducing gases, in the absence of solid carbonaceous material, at about 400 to 600° C., sufficient to reduce the iron sesquioxide component of the insoluble refractory compounds therein only to the stage of ferro-ferric oxide, and thereafter subjecting the product to action of a liquid solvent for said copper, zinc, lead group metal.

2. Process of treating metalliferous material containing a zinc ferrite, which comprises subjecting the same to a reducing gas, at about 400 to 600° C., in the absence of solid carbonaceous fuel, for a time sufficient only to reduce the $Fe_2O_3$ constituent of the ferrite to $Fe_3O_4$ and thereafter leaching the so treated material with an acid leaching agent capable of preferentially dissolving the zinc.

3. A process for the recovery of zinc or copper from ferrite compounds difficultly soluble in dilute acids which are formed during roasting or sintering operations, in contact with compounds of iron, the process consisting in treating such compounds, after they have been discharged from the roasting or sintering furnace, first with an active leaching agent for the non-ferrous metals, then heating the residue with reducing gases as the sole reducing agent, at only a sufficiently high temperature to reduce the ferric oxide content of the ferrite to $Fe_3O_4$, and subsequently leaching.

4. A process for the recovery of zinc or copper from ferrite compounds difficultly soluble in dilute acids which occur as such in nature, the process consisting in treating such compounds, after they have been discharged from the roasting or sintering furnace, with reducing gases at only a sufficiently high temperature to reduce the ferric oxide content of the ferrite to $Fe_3O_4$ and subsequently leaching.

In testimony whereof I affix my signature.

CHARLES C. HAAS.